Figure 1:
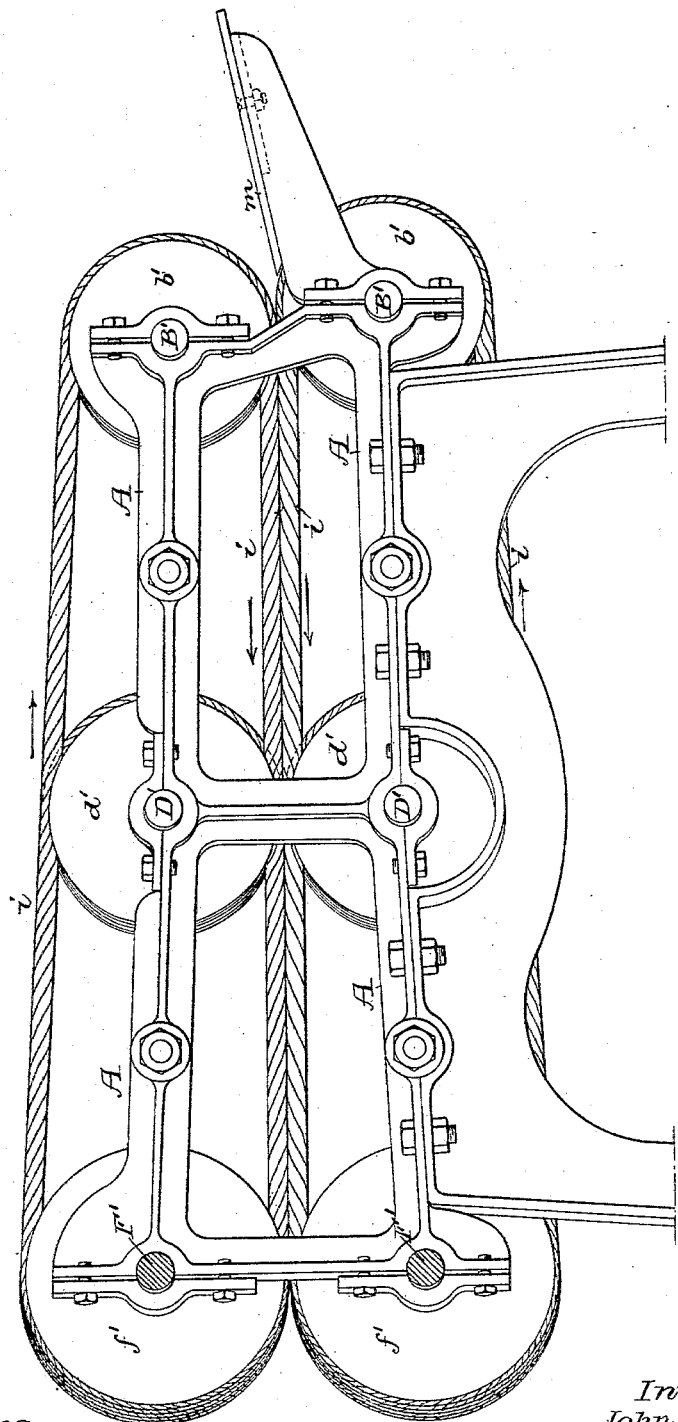

(No Model.) 3 Sheets—Sheet 1.
J. T. CARTER.
TOBACCO LEAF SPREADER.

No. 563,656. Patented July 7, 1896.

Witnesses:
R. Schleicher
Fred C. Benner

Inventor:
John T. Carter
by his Attorneys

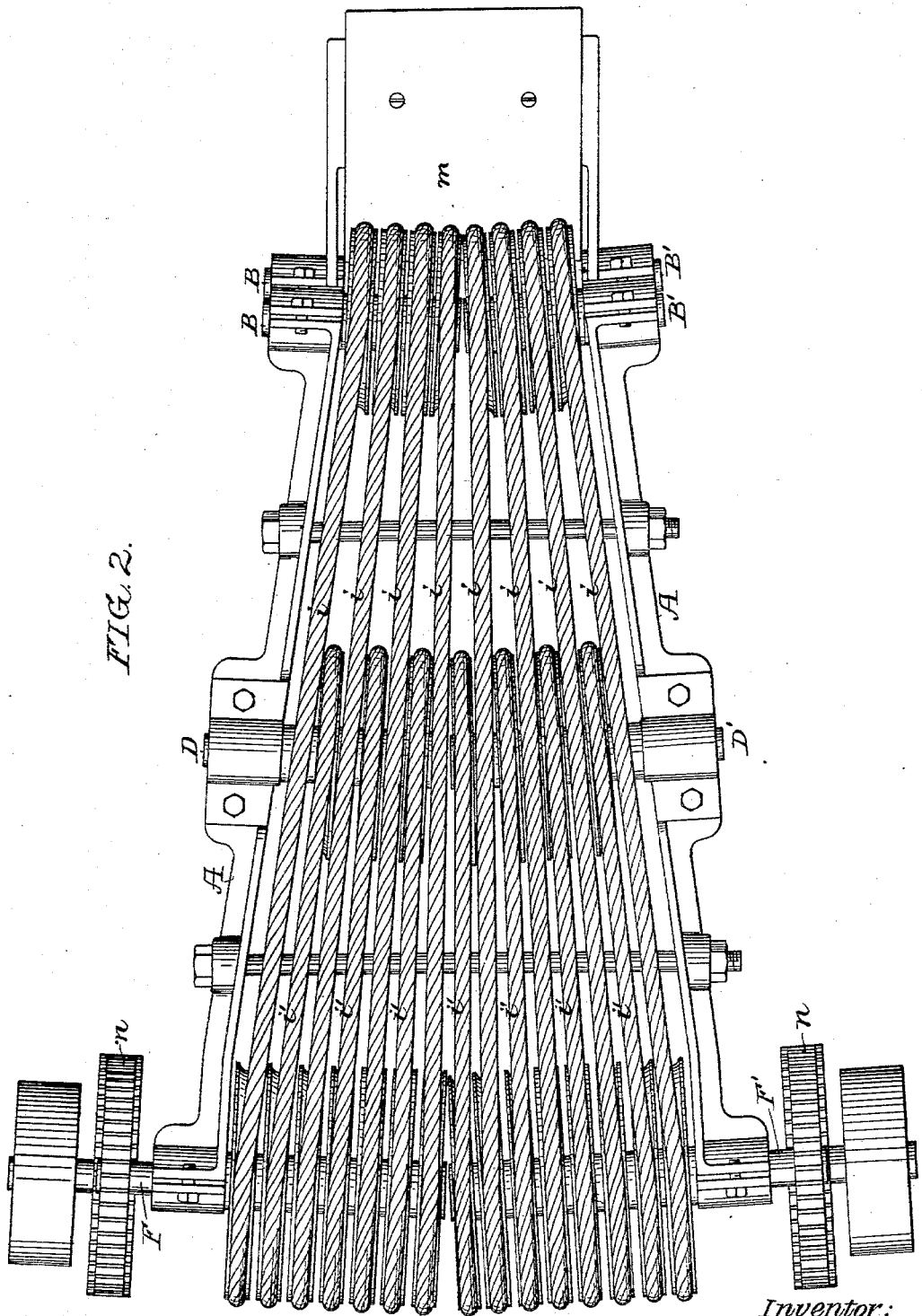

(No Model.) 3 Sheets—Sheet 3.
J. T. CARTER.
TOBACCO LEAF SPREADER.
No. 563,656. Patented July 7, 1896.
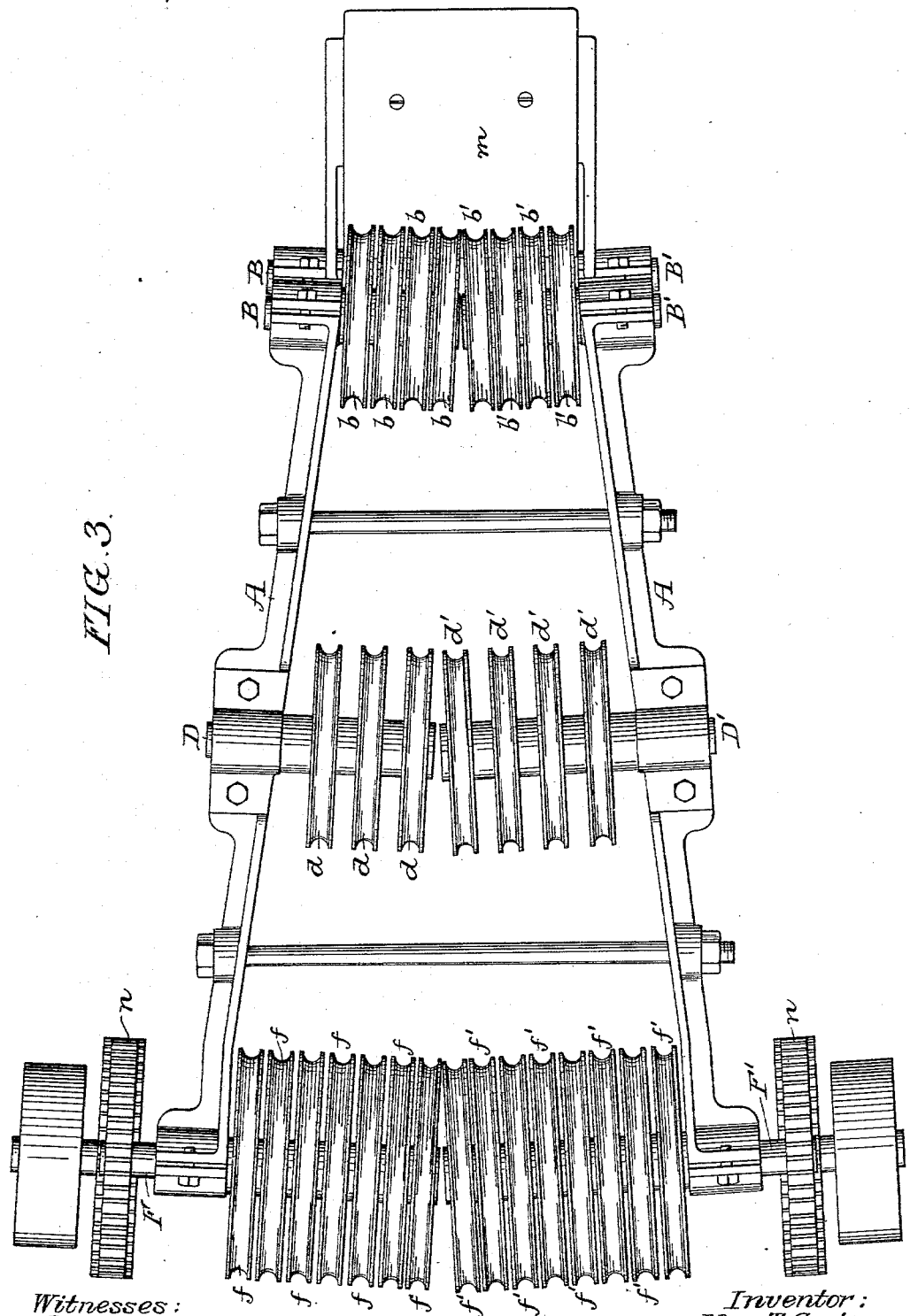
Witnesses:
R. Schleicher
Fred C. Benner
Inventor:
John T. Carter
by his Attorneys
Howson & Howson

UNITED STATES PATENT OFFICE.

JOHN T. CARTER, OF DANVILLE, VIRGINIA.

TOBACCO-LEAF SPREADER.

SPECIFICATION forming part of Letters Patent No. 563,656, dated July 7, 1896.

Application filed November 15, 1894. Serial No. 528,875. (No model.)

*To all whom it may concern:*

Be it known that I, JOHN T. CARTER, a citizen of the United States, and a resident of Danville, Virginia, have invented certain Improvements in Tobacco-Leaf Spreaders, of which the following is a specification.

The object of my invention is to provide a simple and effective machine for spreading, smoothing, and flattening tobacco-leaves prior to the removal of the stems therefrom.

In the accompanying drawings, Figure 1 represents a side view of sufficient of the machine to illustrate my invention. Fig. 2 is a plan view of the machine, and Fig. 3 is a similar view with the belts or bands removed.

A A represent the opposite side frames of the machine, one of these side frames having the bearings for three pairs of shafts B, D, and F and the other side frame have the bearings for three corresponding pairs of shafts B', D', and F', the shafts of each pair being located one above the other.

Each of the shafts has a series of pulleys upon it, the pulleys of the shafts B, D, and F being lettered, respectively, $b$, $d$, and $f$ and the pulleys of the shafts B', D', and F' being lettered, respectively, $b'$, $d'$, and $f'$, each of the pulleys being preferably grooved for the reception of a round belt. An upper and lower series of endless belts is thus provided, and each series comprises two sets of belts. Thus, in the machine shown in the drawings, there are eight belts $i$ extending from the pulleys $b\ b'$ to the pulleys $f\ f'$, and seven belts $i'$ extending from the pulleys $d\ d'$ to the pulleys $f\ f'$, said belts $i'$ alternating with the belts $i$.

Each of the pairs of shafts B, D, and F is set at a slight angle in respect to the central longitudinal line of the machine and the pairs of shafts B', D', and F' are set at a reverse angle, so that the belts take the diverging course illustrated in Fig. 2, this arrangement providing for the close grouping of the belts $i$ at the feed end of the machine, where the pulleys $b\ b'$ are located and where there is also a feed-table $m$, the divergence of the belts $i$ providing the necessary space for the introduction of the shorter alternating belts $i'$, which serve to maintain a comparatively close grouping of the belts at the outlet or discharge end of the machine, where the pulleys $f\ f'$ are located.

The shafts F are geared together by spur-gears $n$ or in some other appropriate manner, and the shafts F' are likewise geared together, so that if power is applied to either shaft of each pair traversing movement will be imparted to all of the belts. This movement is in the direction of the arrows shown in Fig. 1, and the pulleys are so located that the lower runs of the upper series of belts are in close proximity to the upper runs of the lower series of belts. Hence if the tobacco-leaf is inserted between the belts $i$ at the feed end of the machine it will be gripped and carried forward thereby and will at the same time be spread or smoothed out laterally owing to the divergence of the belts, the belts $i'$ acting in like manner as soon as the leaf comes under their influence, so that when the leaf escapes from the delivery end of the machine all portions of the same will have been subjected to this lateral spreading or smoothing action at some time during the forward movement of the leaf. Hence the leaf will be delivered in the best possible condition for the effective removal of the stem therefrom, as well as for the subsequent handling to which the leaf is to be subjected.

While the shafts D D', their pulleys, the secondary set of belts $i'$, and their corresponding pulleys $f\ f'$ may be omitted without departing from the main feature of my invention, their use is preferred, as it provides for a more effective control of the leaf and a more thorough spreading or smoothing of the same than if the secondary set of belts was omitted.

It will be observed that the belts $i\ i'$ are round belts, which are more effective for the intended purpose than flat belts would be, since it is important to confine as little of the leaf as possible between the adjoining runs of the belts in order to secure the maximum of spreading action due to the divergence of the belts.

Having thus described my invention, I claim and desire to secure by Letters Patent—

1. A tobacco-leaf spreader consisting of upper and lower series of endless round belts diverging laterally, the adjoining runs of the belts being adapted to seize and carry forward the leaf and at the same time subject it to a lateral spreading action, substantially as specified.

2. A tobacco-leaf spreader consisting of upper and lower series of endless belts diverging laterally and located so that their adjoining runs are adapted to seize and carry forward the leaf, each series of belts comprising a set of long belts and a set of shorter belts alternating with the long belts, substantially as specified.

3. A tobacco-leaf spreader consisting of a series of pairs of inclined shafts, each having pulleys and round belts adapted to said pulleys and forming two series with adjoining runs adapted to seize and carry forward the leaf, the belts of each series diverging laterally, substantially as specified.

In testimony whereof I have signed my name to this specification in the presence of two subscribing witnesses.

JOHN T. CARTER.

Witnesses:
JAS. T. CATLIN,
MORRIS MOORE.